May 20, 1958 B. A. LEINFELDER, JR., ET AL 2,835,615

METHOD OF PRODUCING A SEMICONDUCTOR ALLOY JUNCTION

Filed Jan. 23, 1956

INVENTORS
BERNHARD A. LEINFELDER, JR
LAWRENCE D. FAVRO

BY William J. Flynn
ATTORNEY

United States Patent Office 2,835,615

Patented May 20, 1958

2,835,615

METHOD OF PRODUCING A SEMICONDUCTOR ALLOY JUNCTION

Bernhard A. Leinfelder, Jr., Newtonville, and Lawrence D. Favro, Cambridge, Mass., assignors to Clevite Corporation, Cleveland, Ohio, a corporation of Ohio Application January 23, 1956, Serial No. 560,755

3 Claims. (Cl. 148—1.5)

Figure 1:
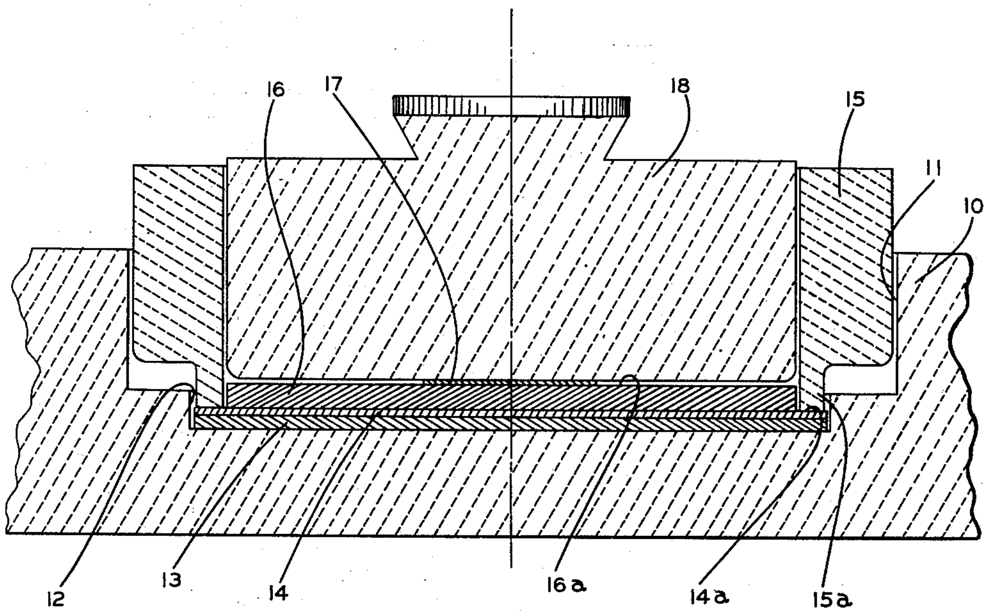

This invention relates generally to a method of producing a semiconductor alloy junction, and is particularly directed to a high current junction having a broad area interface between the semiconductor and the alloying metal.

In the manufacture of germanium-indium alloy junction diodes of high current-carrying capacity, difficulty is encountered in having the indium "wet" the germanium at the broad interface between them. Because of the large area of this interface there is a tendency for the oxides at this interface to prevent the desired wetting action to take place and this reduces the current carrying capacity of the finished diode.

The present invention is directed to a novel method of producing such an alloy junction which insures the removal of oxygen from the interface between the semiconductor and the alloying metal, thereby contributing markedly to the successful operation of such devices.

Accordingly, it is an object of this invention to provide a novel method of producing a semiconductor alloy junction which insures the removal of oxygen at the interface between the semiconductor and the alloying metal.

Also, it is an object of the present invention to provide a novel method of producing a high current-carrying germanium-indium alloy junction diode in which any oxygen at the interface between the germanium and the indium is removed, thereby contributing to the current-carrying capabilities of the finished diode.

Other and further objects and advantages of the present invention will be apparent from the following description of a preferred embodiment, with reference to the accompanying drawing.

Figure 2:
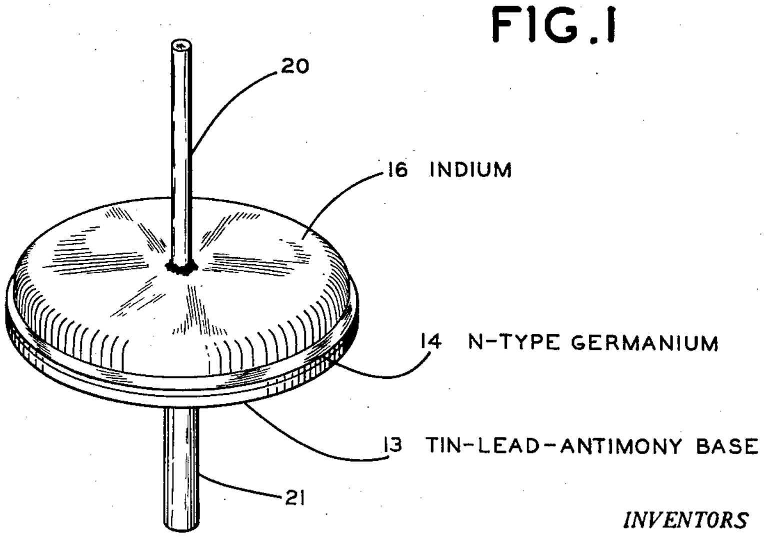

In the drawing:

Figure 1 is a section through an alloying jig with the parts of an alloy junction diode assembled in place prior to alloying; and Figure 2 is a perspective view of the completed alloy junction diode.

Referring to Fig. 1, in a preferred embodiment of the present process there is provided a graphite boat 10 formed with a circular cavity 11 open at its upper face and extending about 1.2 inches across. A smaller shallow circular recess 12 in boat 10 concentric with cavity 11 extends down from the bottom of cavity 11. Recess 12 is about 1 inch in diameter. Seated on the bottom wall of recess 12 is a flat circular base electrode 13 composed of 60% tin, 39.9% lead and 0.1% antimony which is .020 inch thick and .990 inch in diameter. An N-conductivity type germanium wafer 14 about .012 inch thick and the same diameter as the base electrode 13 is positioned contiguously overlying the upper face of the base electrode. A graphite ring 15, which is loosely received in cavity 11, has its reduced diameter lower end 15*a* seated on the upper face 14*a* of the germanium wafer 14, so that the weight of this ring maintains the germanium wafer 14 in intimate contact with the base electrode 13 during alloying.

A flat circular indium wafer 16 about .040 inch thick and .900 inch in diameter is loosely disposed within the lower end of ring 15 and engages the upper face 14*a* of the germanium wafer 14. A thin, flat, circular piece 17 of aluminum foil .004 inch thick and .250 inch in diameter centrally overlies the upper face 16*a* of the indium wafer 16. A graphite plug 18 is loosely received within ring 15 and rests on the aluminum foil 17, thus maintaining the aluminum foil in intimate contact with the indium wafer 16 and maintaining the indium wafer contacting the upper face 14*a* of germanium wafer 14.

This assembly is positioned in a furnace containing a hydrogen atmosphere. When the furnace heat is applied, first the indium 16 melts and the germanium in that portion of the germanium wafer 14 immediately adjacent the indium goes into solution with the molten indium, establishing a germanium-indium region separate from the N-type germanium. While this action is taking place the aluminum goes into solution with the germanium and indium. Any oxygen present in the germanium-indium solution tends to combine with the aluminum because of the higher activity of aluminum than either germanium or indium. This reaction goes to completion, removing all of the oxygen present at the original interface between the germanium and the indium and the insoluble aluminum oxide thus produced is in the form of a precipitate which floats to the top of the indium.

At the same time that the alloying action is taking place at the interface between the indium 16 and the germanium wafer 14, the lead-tin-antimony base electrode 13 is intimately bonded to the lower face of the germanium wafer.

Upon cooling of the diode assembly, there is produced a semiconductive indium-doped germanium region of P-type conductivity separated from the N-type germanium by a rectifying junction. Also, upon cooling, the aluminum oxide forms a readily visible white coating on the upper surface of the indium, which may be removed easily.

Following this, the anode lead wire 20 (Fig. 2) is soldered to the upper surface of the indium and the cathode lead wire 21 is soldered to the base electrode 13. The diode then may be encapsulated in a suitable moisture proof container (not shown).

From the foregoing it will be evident that in the present process any oxides present are completely removed from the broad area original interface between the N-type germanium semiconductor material and the indium alloying metal, thereby insuring good wetting action of the alloying metal on the semi-conductor material. As a result, the finished diode made in accordance with the foregoing process has excellent high current-carrying properties.

It is to be understood that, while there has been disclosed herein a particular preferred embodiment of the present invention, various modifications and refinements which depart from the disclosed embodiment may be adopted without departing from the spirit and scope of this invention.

We claim:

1. A method of making a semiconductor alloy junction which comprises the steps of positioning a piece of indium overlying a semiconductive N-type germanium body, heating the indium and germanium to cause the indium to go into solution with the adjacent portion of the germanium, during said heating providing aluminum at the interface between the indium and the germanium to combine with any oxygen thereat and form an aluminum-oxide precipitate which floats to the top of the indium, cooling the assembly of germanium, indium and aluminum to produce a semiconductive P-type indium-doped germanium region separated from the N-type germanium by a rectifying junction and to produce on the upper surface of the indium an aluminum oxide coating, and removing said aluminum oxide coating from the upper surface of the indium.

2. A method of making a semiconductor alloy junction which comprises the steps of providing an assembly of indium and aluminum overlying a semiconductive body of N-type germanium, heating the germanium body and the overlying indium and aluminum in a reducing atmosphere to melt the indium and cause the indium to go into solution with the adjacent portion of the germanium and to cause the aluminum to combine with any oxygen at the interface between the indium and the germanium body and form an insoluble aluminum oxide precipitate which floats to the top of the indium, and cooling said assembly to produce a semiconductive P-type indium-doped germanium region separated from the N-type germanium by a rectifying junction and to produce an aluminum oxide coating on the upper surface of the indium.

3. A method of making a semiconductor alloy junction which comprises the steps of providing an assembly made up of indium overlying a semiconductive body of N-type germanium and a thin sheet of aluminum overlying the indium, heating said assembly under a hydrogen atmosphere to cause the indium to melt and go into solution with the adjacent portion of the germanium to form therewith a germanium-indium region separate from the N-type germanium and to cause the aluminum to go into solution with the indium and germanium and combine with any oxygen at the interface between the indium and the germanium body to form an insoluble aluminum oxide precipitate which floats to the top of the indium, cooling said assembly to produce a semiconductive P-type indium-doped germanium region adjacent the N-type germanium and separated therefrom by a rectifying junction barrier and to produce an aluminum oxide coating on the upper surface of the indium, and removing said aluminum oxide coating.

References Cited in the file of this patent

UNITED STATES PATENTS 2,480,351 Anderson ---------------- Aug. 30, 1949
2,736,847 Barnes ------------------- Feb. 28, 1956